INVENTORS.
ROBERT S. BARTON
BOBBY A. CREECH
BENJAMIN A. DENT
ERWIN A. HAUCK
WILLIAM M. McKEEMAN
BY Christie, Parker & Hale
ATTORNEYS.

Aug. 12, 1969 R. S. BARTON ET AL 3,461,434

STACK MECHANISM HAVING MULTIPLE DISPLAY REGISTERS

Filed Oct. 2, 1967 3 Sheets-Sheet 2

STACK MECHANISM HAVING MULTIPLE DISPLAY REGISTERS

Filed Oct. 2, 1967

3 Sheets-Sheet 3

United States Patent Office 3,461,434
Patented Aug. 12, 1969

3,461,434

STACK MECHANISM HAVING MULTIPLE DISPLAY REGISTERS

Robert S. Barton, Salt Lake City, Utah, Bobby A. Creech, Glendora, Benjamin A. Dent, Altadena, Erwin A. Hauck, Arcadia, and William M. McKeeman, Palo Alto, Calif., assignors to Burroughs Corporation, Detroit, Mich., a corporation of Michigan Filed Oct. 2, 1967, Ser. No. 672,688
Int. Cl. G11b *13/00*
U.S. Cl. 340—172.5 12 Claims

ABSTRACT OF THE DISCLOSURE

A data processing system having a main memory for storing stacks of information for processing. An additional memory has individually selectable display registers each containing a different absolute memory address of a base of a stack area used to store variables for a particular level of a job program. A group of registers are provided for storing various information including a reference word which contains a level value designating a particular display register and an index value. Gating and timing is provided for obtaining an absolute address contained in the display register designated by the stored level value. An address adder combines the selected absolute address with the stored index value to derive the absolute address of data in the corresponding stack area.

CROSS REFERENCES TO RELATED APPLICATIONS

The present invention is directed to the multiple display registers disclosed herein. A copending patent application bearing Ser. No. 672,042, filed Oct. 2, 1967, entitled Procedure Entry for a Data Processor Employing a Stack filed in the names of the same inventors as the present application and assigned to the same assignee as the present application is directed to the means by which the data processor employing a stack enters a new procedure. Another copending patent application bearing Ser. No. 672,226, filed Oct. 2, 1967, entitled Data Processing System Having Free Structured Stack Implementation, filed in the names of the same inventors as the present application and assigned to the same assignee as the present application is directed to the structured stack implementation utilizing the display registers disclosed herein.

BACKGROUND OF THE INVENTION

This invention relates to data processing apparatus and, more particularly, to digital computers employing stack mechanisms.

ALGOrithmic Language, commonly known as ALGOL, the language for expressing algorithms, was developed by an international group of computer people. ALGOL is defined in the May 1960 issue of the "Communications of the Association for Computing Machinery," in "Report on the ALGOrithmic Languages ALGOL '60," edited by Peter Naur. One of the purposes of ALGOL is to give a set of rules by which procedures can be described in a form that can be accepted by a computer. However, programs expressed in ALGOL cannot be accepted directly by present computers and the ALGOL programs must be translated into Machine Language. Machine Language is the actual code which causes each computer to carry out its own actual computing operations.

Programming aids and hardware aids have been employed in a prior art computer to minimize the translation between ALGOL programs and actual Machine Language codes. One such hardware aid is a stack mechanism in which information is placed on a last in, first out basis.

The stack mechanism serves two basic functions. One is that it provides a means for the temporary storage of parameters and references to data and program segments and, a second is that it provides a means to store an indication of the history of a program.

A very important concept in a program written in ALGOL is that it is arranged into blocks. A block may contain sub-blocks. In the prior art computing machine employing a stack, the stacks contain storage areas for each ALGOL block. Each block storage area of a stack has a "Mark Stack Control Word" (MSCW). The MSCW is located at the beginning of each block storage area and serves to identify the particular block storage area. All parameters within the block storage area are referenced by addressing relative to the location of the corresponding MSCW.

A very important rule of ALGOL is in regard to "local and global" parameters and variables. The rule is that a parameter or variable may be referred to in an ALGOL block only if it is "local" or 'global" to such block. A parameter or variable is "local" to a particular ALGOL block only if it is defined within such block. A parameter or variable is "global" to a particular block if such block is a sub-block to the block in which the parameter or variable is defined.

Two different lists have been proposed in the literature as a programming feature. One list is referred to as the stack history list, and the other the addressing environment list. The stack history list refers to the actual sequential order in which a stack is built. The addressing environment list refers to the sequential ordering of the block storage areas according to the block structure rules of ALGOL. The stack history list and the address environment list are formed by information contained in the words which mark the beginning of each block storage area. In the embodiment of the invention disclosed herein, these words are the MSCW's referred to hereinabove. FIG. 1 is a pictorial drawing illustrating how the MSCW's display the stack history list and the address environment list for a particular stack. As indicated at the left side of FIG. 1, the local storage for blocks, A, B, C, D, E and F were formed in that order and the MSCW's provide a stack history list so indicating (the arrows point in the reverse direction). In contrast, the MSCW's show that the ALGOL address environment list is quite different, as is indicated at the right side of FIG. 1. FIG. 2 is a tree structure diagram which illustrates the ALGOL address environment list in a different pictorial form. As indicated by the numbers positioned adjacent each of the circles shown in FIG. 2, the procedural blocks were called by the computer in the order A, B, C, D, E and F. In contrast, however, the address environment list is such that blocks D and B are sub-blocks of block A and blocks E and F are sub-blocks of block D, etc. Block storage A is defined as the outermost block storage area.

Thus, returning to the ALGOL concept of "local" and "global" variables for a moment, a variable or parameter defined in block storage A can be obtained and used in either of blocks D, E and F. Also, variables defined in block D can be obtained and used in either of blocks E and F.

The concept of the stack history list formed in MSCW's has been implemented in the circuitry of a prior art computing machine. However, the concept of the address environment list has not. In the prior art machine incorporating the stack history concept, addressing within a stack is made relative to two registers. One register stores an address which points to the MSCW marking the beginning of the block storage area in which the computer is presently working. The other register is one which points to the MSCW of the outermost procedural block. These registers are depicted at the right side of FIG. 2 as the F and R registers. The F register contains an absolute address of the MSCW for block storage F. The R register contains the absolute address of the MSCW for the outermost block, namely the block storage A. Thus, to address a parameter within the outermost block storage A, addressing is done relative to the absolute address in the R register. To address a parameter within current block storage F, addressing is done relative to the absolute address in the F register.

However, this organization has given rise to an uplevel addressing problem. The uplevel addressing problem arises because the parameters and variables within all the intervening blocks (i.e. D), between the outermost block storage (i.e. A) and the current block storage (i.e. F), are invisible to the current procedure and the computer and, therefore, these parameters and variables cannot be referenced in the current procedure. For example, with the computer currently working in block storage F, the parameters stored in block storage D could not be referenced because only parameters and variables stored in the current block storage F and the outermost block storage A could be referenced.

SUMMARY OF THE INVENTION

In contrast, the parameters and variables and the intervening block storage areas are made visible in the present invention through a group of display registers. One display register is provided to point at the MSCW for each block storage area which it is permissible to reference. In other words, each display register contains the absolute address of a MSCW. Using the display registers, the local parameters of the intermediate procedures may now be addressed relative to the absolute addresses in the appropriate display registers. The display registers used are depicted at the left hand side of FIG. 2 and are referenced by the symbols D1, D2, etc.

Programming techniques have been devised which use program display registers in a similar manner. Such a programming system is described on pages 62 through 71 of the book entitled "ALGOL 60 Implementation" by Randell & Russell published in 1964 by the Academic Press. However, the programming concept requires a prohibitive amount of memory space and is not practicable. Accordingly, the present invention is directed to the hardware implementation of this concept in a unique and novel manner.

Briefly, an embodiment of the invention includes main memory means for storing stacks of information for processing. A plurality of individually selectable display registers is provided, each containing a different absolute memory address of a base of a stack area used to store variables for a particular level of a job program. A register is provided for storing a reference word for a particular job program being carried out which includes a level value designating a particular display register and includes an index value. Means is provided for obtaining the absolute address contained in the display register designated by the stored level value. Means is provided for selectively combining such absolute address with the stored index value to derive the absolute address of data in the corresponding stack area. Means is provided for addressing the memory means with the derived absolute address for obtaining the data contained at such address.

DESCRIPTION OF THE PREFERRED EMBODIMENT

Figure 3:
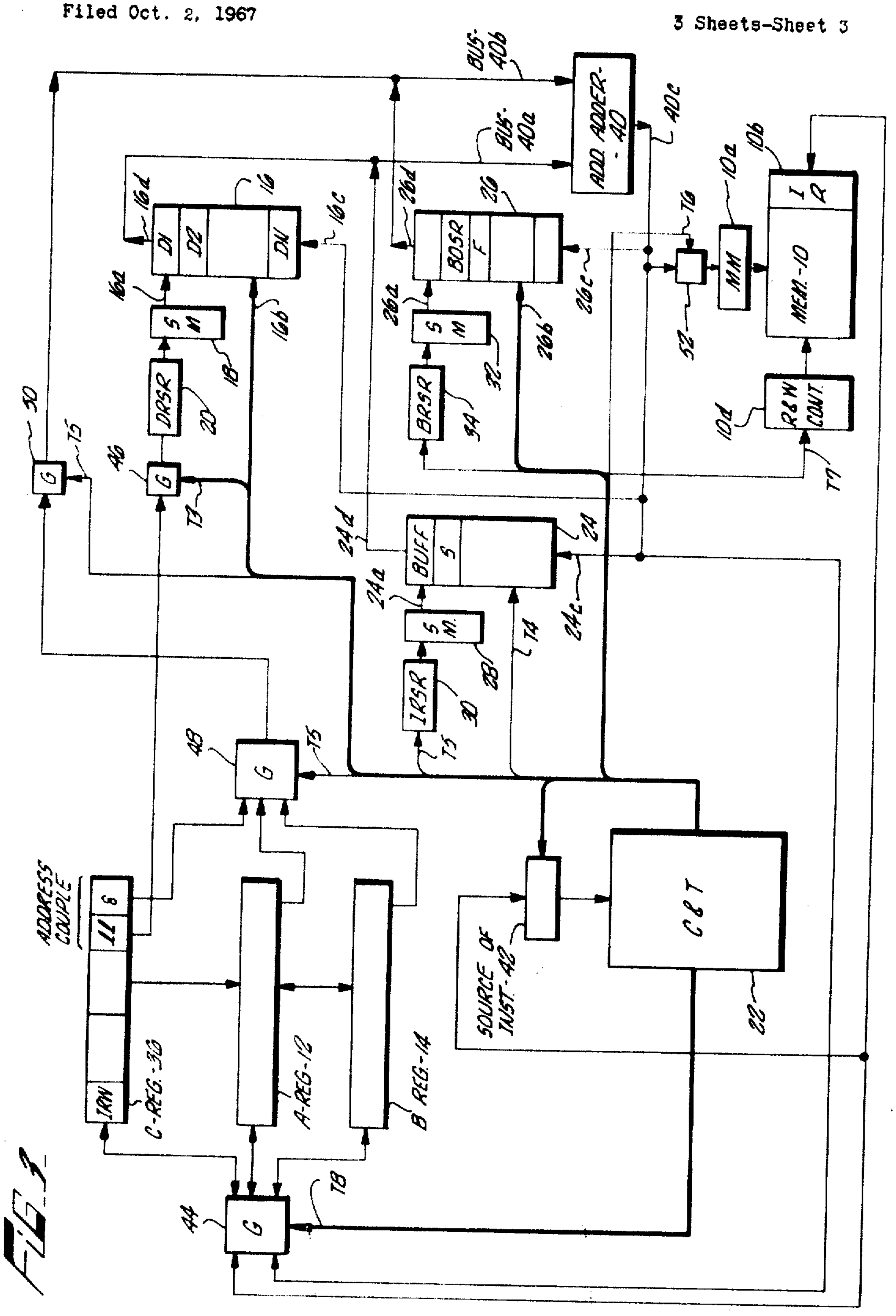
FIG. 3 is a block diagram of the computer system embodying the present invention.

Refer now to the computer system of FIG. 3 embodying the present invention. A stack mechanism includes a group of storage locations and registers F and S contained in two memories 24 and 26. The storage locations are in a memory 10 and in A and B registers 12 and 14. The F and S registers keep track of the memory locations in memory 10 being used as the stack. The A and B registers 12 and 14 form the top two storage locations of the stack. Information is put into the A register and then transfered down to the B register and then transferred from the B register into storage locations in the memory 10. Information is brought back out of the stack in the reverse order and taken out of the top of the stack from the A register. As a word is taken out from the A register, the information in the rest of the stack is effectively pushed up one position so that the A register is again filled. The details of operation of the stack are not essential for a complete understanding of the operation of the invention and, therefore, are not given herein. However, such a stack is described in detail in the book entitled "Electronic Digital Systems" by R. K. Richards published in 1966 by John Wiley & Sons, Inc. on pages 224 through 229.

The system also includes a memory 16 having a group of display registers. The display registers are referenced by the symbols D1 through DN. Each display register 16 contains an absolute address of a memory location in the memory 10. To be explained in more detail, each display register that is used contains the absolute address of the beginning of a block of storage in a stack contained in the memory 10.

The display registers 16 are each formed of a group of transistor flip-flop circuits and all the registers together form a memory. There are a group of input lines **16*a*, one line for each of the display registers D1 through DN. A read signal on any one of the lines causes the content of the corresponding register to be read out and applied on an output bus 16*d***.

Associated with the display registers 16 is a selection matrix 18 and a display register selection register (hereinafter referred to as the DRSR register) 20. A lexicographical level value (*ll*) is transferred into the DRSR register and designates a particular display register. The selection matrix 18 is responsive to the lexicographical level value (*ll*) contained in the register 20 to provide a signal on the corresponding one of the read lines **16*a*, causing the content of the corresponding display registers 16 to be read out onto the bus 16*d***.

A control and timing unit 22 has a group of output lines connected to input lines **16*b* of the display registers 16. One line is provided in 16*b* for each of the registers 16 and a signal on a line causes the corresponding register to have an address written therein. A group of input lines 16*c* to the display registers 16 to carry the signals of an address is to be written into the display registers. The address signals appear in the lines 16*c*** in parallel.

Such a memory is disclosed in a copending patent application entitled Associative Memory filed in the name of Edwin S. Lee, III, on May 6, 1963 and given Ser. No. 278,021.

Two additional memories 24 and 26 are provided which contain a group of miscellaneous storage registers used in the computer system. The memories 24 and 26 are flip-flop circuits identical to the display registers 16, and contain output buses **24*d* and 26*d*, write control lines 24*b* and 26*b*, and information input lines 24*c* and 26*c*, respectively. Also associated with the memory 24 is a selection matrix 28 and an IRSR register 30, which function in a similar manner to the DRSR register 20 and the selection matrix 18. Associated with the memory 26 is a selection matrix 32 and a BRSR register 34 which also functions in a similar manner to the elements 20 and 18 for the display registers 16**.

A C register 36 is one of the working registers in the data processing system of FIG. 3. One type of information word that is stored into the C register 36 is an indirect reference word. The indirect reference word provides addressing information for the execution of subsequent operators. Among the signals contained in an indirect reference word is a designation that the word is an indirect reference word (IRW) and an "address couple." The address couple is subdivided into two functional fields. The first field is the *ll* field which is used to select one of the N display registers in the memory 16. The second field is an index value ($\delta$) which, when added to the content of the selected display register, forms an absolute address of a desired parameter to be obtained from a stack in the memory 10. The use of the information in an indirect reference word to select a display register and in turn select a particular storage position in stack in memory, is one of the more important aspects of the present invention and should be carefully noted in the following discussion.

An address adder 40 is provided for adding two quantities together to form an address. One important purpose of the adder 40 is to combine an absolute address contained in one of the display registers 16 with an index value ($\delta$) contained in the C register 36 to derive the address of a parameter needed from memory 10. The address adder 40 has two input buses **40*a* and 40*b* and an output bus 40*c***.

The memory 10 is a conventional magnetic core memory system having an information register **10*b*, and address register (hereinafter referred to as the MM register) 10*a*, and a read and write control circuit 10*d*. All information read out of the memory 10 and written into the memory 10 is done via the information register 10*b*. The address of the memory location into which information is written and read out of is controlled by addresses stored in the MM register 10*a***.

A source of instructions 42 provides actual operators or instructions which dictate the operation to be performed by the data processing system of FIG. 3. The source of instructions 42 may consist of one or more registers for storing instructions derived from the memory 10.

All control in the data processing system of FIG. 3 is by way of control signals from the control and timing unit 22. The control and timing unit 22 is a conventional control and timing unit for the data processing system and provides control signals on output cables which are represented by the thick heavy lines shown in FIG. 3. The control lines out of the cable which are of importance herein are referenced by the symbol T followed by a numeral, i.e. T3, T4, etc. The sequence of timing is described in detail hereinafter.

Figure 1:
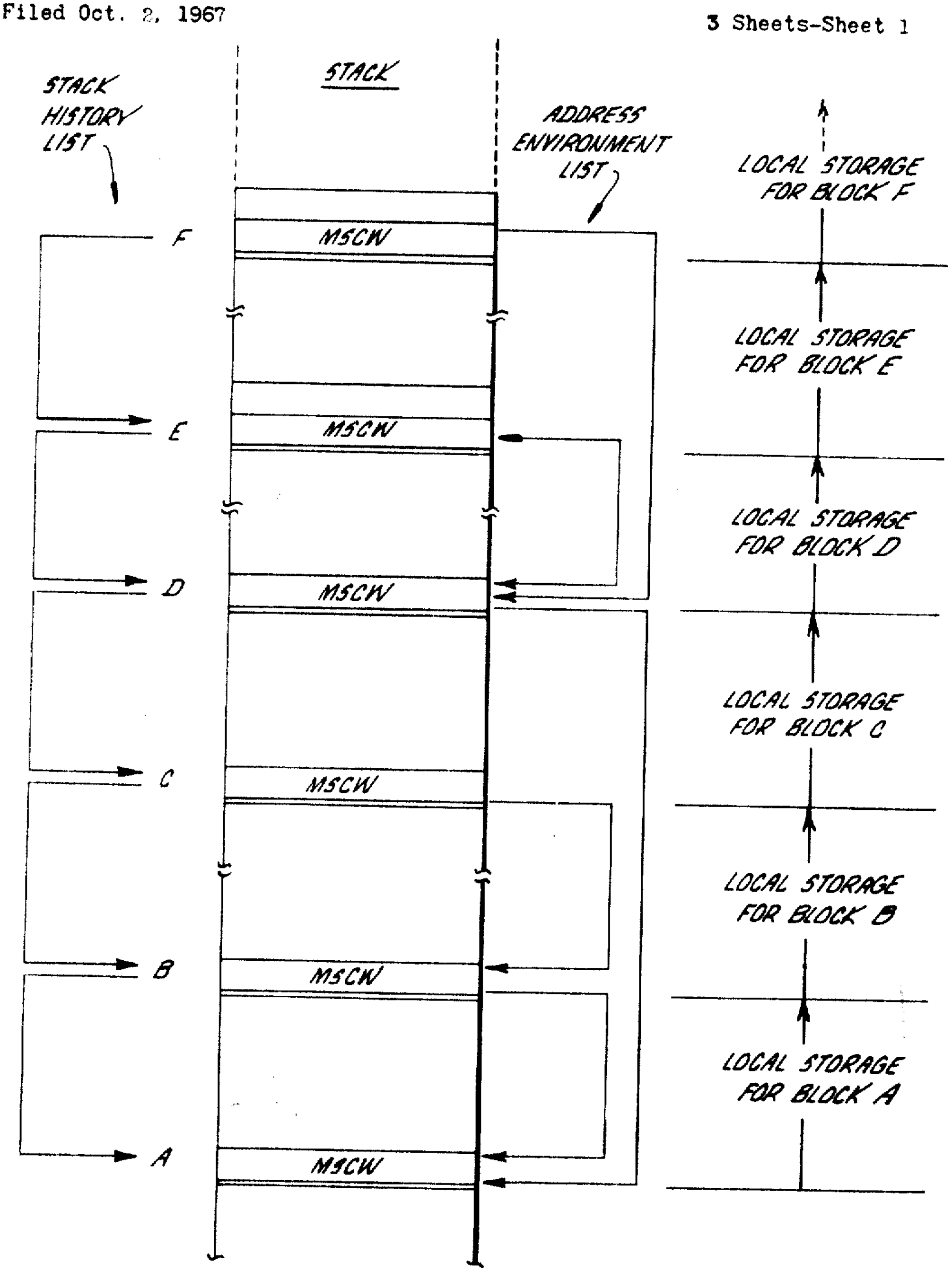
FIG. 1 is a pictorial diagram showing an example of a stack and illustrating one example of the stack history list and the address environment list.
Figure 2:
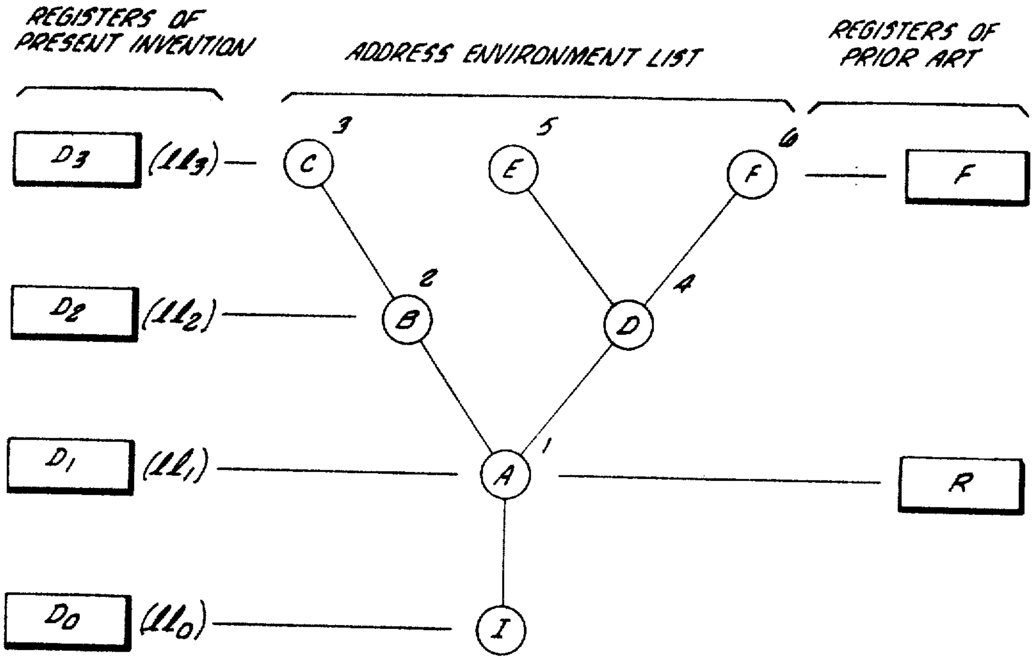
FIG. 2 is a pictorial diagram illustrating the address environment list in a tree-structured form and illustrating the registers required in a prior art computer and the registers required in the present invention.
Figure 4:
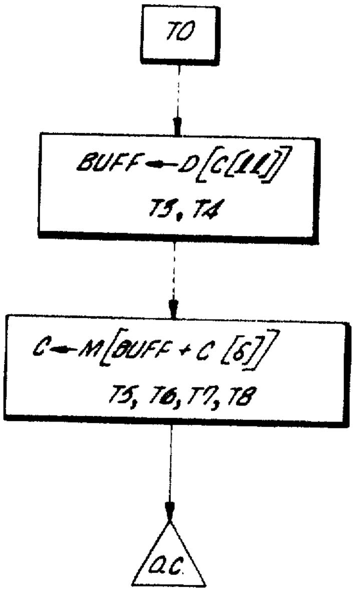
FIG. 4 is a flow chart illustrating the sequence of operation of the computer system shown in FIG. 3.

Reference should be made in the following discussion to the flow diagram of FIG. 4. The various blocks contained in FIG. 4 contain symbols which symbolically represent the actual operation of the system of FIG. 3. These symbols and their meaning will be described in the following discussion of the operation.

Many different types of operators can be executed in the data processing system. Many of these operators involve the use of an indirect reference word and require the use of the display registers 16 for forming the absolute address of a desired parameter in a block storage area in memory. It is not essential for a complete understanding of the present invention to give all the many steps required to carry out the various operations, therefore, only those steps which are essential to an understanding of the invention will be described.

Consider now a specific example of the operation. Assume now that the computer system is about to obtain a variable or parameter from a block storage area of a stack and store the variable into the C register 36 for further computation. An indirect reference word is contained in the C register 36. First, the computer system will go from the initial operation in block T0 into the block of FIG. 4 containing the symbols T3 and T4. Here, as represented by the symbols in the block, the content of the display registers specified by the lexicographical level (*ll*) value of the indirect reference word contained in the C register is transferred to a temporary storage register referred to as the BUFF register in the memory 24.

To this end, the control signal formed by the control and timing unit 22 at T3 causes the gate 46 to gate the lexicographical level (*ll*) value into the DRSR register 20, causing the corresponding display register to be read out of memory 16 by the selection matrix 18. This causes the absolute address read from the display registers to be applied to the bus **40*a* for the address adder 40. However, no address is simultaneously applied to the bus 40*b*. Consequently, the address adder 40 applies the absolute address on the bus 40*a* unaltered, to the output bus 40*c*. The following control pulse at T4 applies a write signal to the BUFF register causing the absolute address applied to the bus 40*c* to be written into the BUFF register of the memory 24**.

Subsequently, the computer systems enters the block of FIG. 4 containing the control signals T5, T6, T7 and T8. During this block the address now contained in the BUFF register is combined with the index value ($\delta$) contained in the indirect reference word contained in the C register. The control signal at T5 causes a gate 48 to gate out the index ($\delta$) value contained in the C register 36 to a gate 50. The control signal at T5 causes the gate 50 to gate the index value ($\delta$) to the bus **40*b*. The control signal on T5 also causes an address to be stored into the IRSR register 30 which selects the BUFF register. The absolute address contained in the BUFF register is read out in the memory 24 and applied to the bus 40*a* which is the other input to the address adder 40. At this point in time, the absolute address applied on bus 40*a*** (the absolute address which was obtained from the display registers specified by (*ll*)) is added to the increment ($\delta$) value applied on bus **40*b*. As a result, the sum of the two is applied on the bus 40*c* by the address adder 40. Subsequently, a control signal is formed at T6 causing a gate 52 to store the resulting address into the MM register 10*a***.

The control and timing unit 22 subsequently forms a control signal at T7 which causes the read and write control circuit **10*b* to initiate a memory read cycle. This causes the parameter contained at the location specified by the address in 10*a* to be read out into the information register 10*b*. Subsequently the control and timing unit 22 forms a control signal at T8 which causes the parameter contained in the information register 10*b* to be stored into the C register 36 by the gating circuit 44**.

It should now be evident that the absolute address specified by the lexicographical level (*ll*) value contained in the C register 36 is read out, temporarily stored in the BUFF register and then combined with the index ($\delta$) value stored in the C register 36, the address adder 40 being the unit which actually combines the two values together. The result is then stored into the MM register **10*a* which addresses the corresponding memory location in the memory 10, causing the desired parameter to be read out and stored in the C register 36**. Thus, the BUFF register is merely a temporary storage device for the absolute address and serves as a coupling for the the address between the display registers and the address adder.

Subsequently, the control and timing unit 22 goes to the operation complete state (OC) terminating the operation.

The problems of the prior art and their solution by means of the present invention have been given with reference to the programming language known as ALGOL. However, similar problems exist and the solutions to these problems by means of the present invention is equally applicable to other languages that are similar to ALGOL. These languages are known as ALGOL-like languages. One example of an ALGOL-like language is known as PL/I and is defined in the report entitled "IBM System 360 Operating System PL/I Language Specifications," published by the IBM Corporation in December 1966 and identified as IBM SRL C-28-6571-3.

Although one example of the present invention has been shown by way of illustration, it should be understood that there are many other rearrangements and embodiments of the present invention in the scope of the following claims. For example, the absolute address could be combined with the index value (δ) directly as the address is read from the display register, rather than storing it temporarily in the BUFF register by appropriately rearranging the circuitry and timing.

What is claimed is:

1. In a data processing system the combination comprising, main memory means for storing stacks of information for processing, a plurality of individually selectable display registers each containing a different absolute memory address of a base of a stack area used to store items of information for a particular level of a program, a register for storing a reference word for a particular program being carried out which includes a level value designating a particular display register and includes an index value, means for selectively obtaining the absolute address contained in the display register designated by the stored level value, means for selectively combining such absolute address with the stored index value to derive the absolute address of an item of information in the corresponding stock area and means for addressing said memory with the derived absolute address for obtaining the item of information contained at such address.

2. In a data processing system as defined in claim 1 including selection register means for storing the level value from the reference word and selection means responsive to the content of the selection register means for selecting the display register designated thereby.

3. In a data processing system as defined in claim 1 wherein said combining means includes an adder means and means coupling the adder means to said display registers and said reference word storage register.

4. In a data processing system the combination comprising, main memory means for storing stacks of information for processing, a plurality of individually selectable display registers each containing a different absolute memory address of a base of a stack area used to store items of information for a particular level of a program, a register for storing a reference word for a particular program being carried out which includes a level value designating a particular display register and includes an index value, selection means responsive to the stored level value for selectively obtaining the absolute address contained in the corresponding display register, a register for storing the absolute address obtained by the selection means, means for selectively combining such stored absolute address with the stored index value to derive the absolute address of an item of information in the corresponding stack area and means for addressing said memory means with the derived absolute address for obtaining the item of information contained at such address.

5. In a data processing system the combination comprising, main memory means for storing stacks of information for processing, a plurality of display registers each containing a different absolute memory address, a register for storing a reference word for a particular job program being carried out which includes a level value designating a particular display register and includes an index value, a register for storing the level value, selection means responsive to the level value stored in the level value storage register for selectively obtaining the absolute address contained in the corresponding display register, a register for temporarily storing the absolute address from the selection means, adding means for selectively combining such stored absolute address with the stored index value to derive the absolute address of an item of information in the memory means and means for addressing said memory means with the derived absolute address for obtaining the item of information contained at such address.

6. In a data processing system the combination comprising, addressable main memory means for storing stacks of information organized into block storage areas, each storing items of information for a particular program being executed, a plurality of individually addressable display registers each containing a different absolute address of a base of a block storage area, a first register for storing a designation of a particular display register, read selection means for causing the absolute address of the display register designated by said first register to be read out, a second register for storing a reference word for a particular program being carried out which includes a level value designating a particular display register and includes an index value, means for selectively transferring a stored level value to said first register causing read out of an absolute address from the designated display register, and address adding means operatively coupled to the read out absolute address and the stored index value for combining same and for forming an absolute address for the memory means at which a desired item of information can be obtained.

7. In a data processing system the combination comprising, addressable main memory means for storing stacks of information organized into block storage areas, each storing items of information for a particular job of a program being executed, a separate memory comprising a plurality of individually addressable display registers each containing a different absolute address of a base of a block storage area, a first register for storing a designation of a particular display register, read selection means for causing the absolute address of the display register designated by said first register to be read out, a second register for storing a reference word for a particular program being carried out which includes a level value designating a particular display register and includes an index value, means for selectively transferring a stored level value to said first register causing read out of an absolute address from the designated display register, and address adding means operatively coupled to the read out absolute address and the stored index value for combining same and for forming an absolute address for the memory means at which a desired item of information can be obtained.

8. In a data processing system as defined in claim 7 wherein said adding means comprises a pair of input buses and said display register memory comprises an output circuit coupled to one of said input buses and gating means for selectively coupling the index value from said second register to the second input bus of said adding means.

9. In a data processing system as defined in claim 8 wherein said adding means comprises an output bus and further gating means coupled thereto for applying the resulting address from the output bus to said memory means.

10. In a data processing system as defined in claim 9 wherein said memory means includes an address register and said further gating means stores the resulting address on said output bus into said address register.

11. In a data processing system including a memory, the system including apparatus defining stacks comprising sequential memory locations of the memory in which information items are stored for use in processing the combination comprising a plurality of individually selectable display registers external to the memory each containing a different absolute memory address of a base of a stack area used to store items of information for a particular level of a program, means for storing a level value designating a particular display register, means for storing an index value, means for selectively combining the absolute address contained in the display register designated by the stored level value with the stored index value to derive the absolute address of an item of information in the corresponding stack area and means for addressing the memory with the derived absolute address for obtaining the item of information contained at such address.

12. In a data processing system comprising a memory having a series of sequentially addressable memory locations for use in storing certain information items for use in processing, means for addressing the memory the address forming portion thereof including a plurality of individually selectable display registers external to the memory each containing a different absolute memory address of the beginning of a series of said memory locations, means for storing a level value designating a particular display register, means for storing an index value, means for selectively combining the absolute address contained in the display register designated by the stored level value with the stored index value to derive the absolute address of an item of information in the corresponding memory location.

References Cited

UNITED STATES PATENTS

| | | |
|---|---|---|
| 3,354,430 | 11/1967 | Zeitler et al. |
| 3,343,135 | 9/1967 | Freiman et al. |
| 3,222,649 | 12/1965 | King et al. |
| 3,153,225 | 10/1964 | Merner et al. |
| 3,047,228 | 7/1962 | Bauer et al. |

GARETH D. SHAW, Primary Examiner